United States Patent [19]

Trautner et al.

[11] E Re. 28,902

[45] Reissued July 13, 1976

[54] VIBRATORY CORE FOR CONCRETE PIPE MAKING MACHINE

[75] Inventors: Ferdinand A. Trautner, Wellesley Hills, Mass.; LeRoy E. Kent, Sioux City, Iowa

[73] Assignee: Concrete Pipe Machinery Company, Sioux City, Iowa

[22] Filed: Aug. 1, 1975

[21] Appl. No.: 601,036

Related U.S. Patent Documents

Reissue of:

[64] Patent No.: 3,752,626
Issued: Aug. 14, 1973
Appl. No.: 867,344
Filed: Oct. 17, 1969

U.S. Applications:

[63] Continuation-in-part of Ser. No. 638,010, May 12, 1967, abandoned.

[52] U.S. Cl. ..... 425/262; 425/432; 425/421

[51] Int. Cl.[2] ..... B28B 21/28

[58] Field of Search ..... 425/262, 432, 421

[56] References Cited

UNITED STATES PATENTS

| | | | |
|---|---|---|---|
| 937,178 | 10/1909 | Rentzsch | 425/DIG. 22 |
| 1,504,834 | 8/1924 | Robbins | 425/431 |
| 1,670,557 | 5/1928 | Wettstein | 425/DIG. 22 |
| 3,334,390 | 8/1967 | Steiro | 425/193 |
| 3,343,236 | 9/1967 | Helms | 425/432 X |
| 3,358,342 | 12/1967 | Spence | 425/262 |

*Primary Examiner*—J. Howard Flint, Jr.
*Attorney, Agent, or Firm*—Thomas M. Scofield

[57] ABSTRACT

A novel vibrating core apparatus for use with a concrete pipe making machine. The novel apparatus includes a core, vertically movable into and out of a pipe form, a series of vibrators attached along the interior side wall of the core, an upwardly movable system operative by fluid pressure for raising and lowering the core, and an interlocking connection between a standard packerhead, which distributes cementitious material about the interior of the pipe form, and the upper portion of the core. The packerhead is designed to rotate while forming the pipe; the core does not rotate and the connecting means between the two is easily attached and disengaged from the packerhead.

22 Claims, 10 Drawing Figures

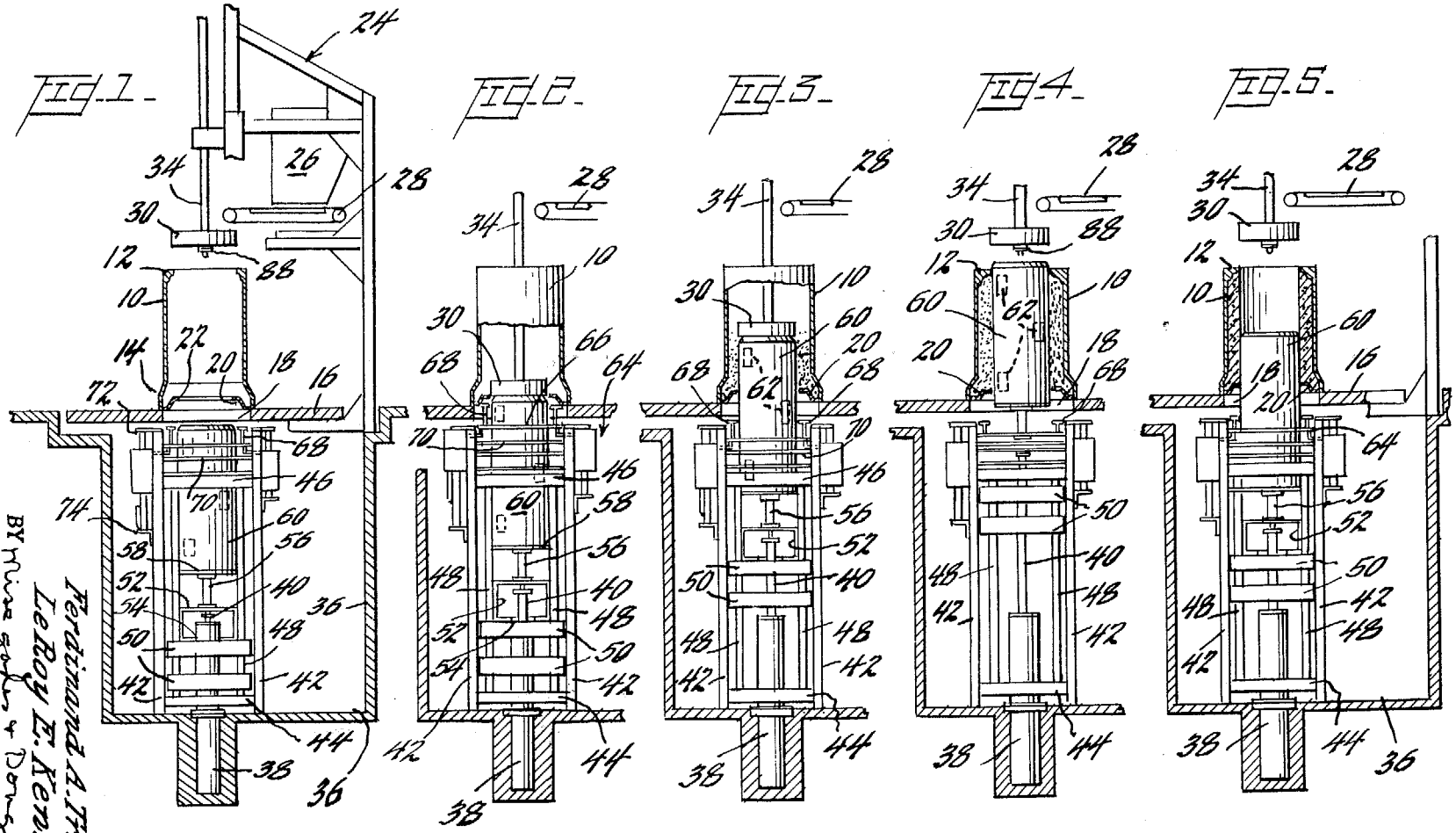
INVENTORS
Ferdinand A. Trautner
LeRoy E. Kent
BY Wise gates & Douglas
Kirk Wisegates
ATTORNEYS

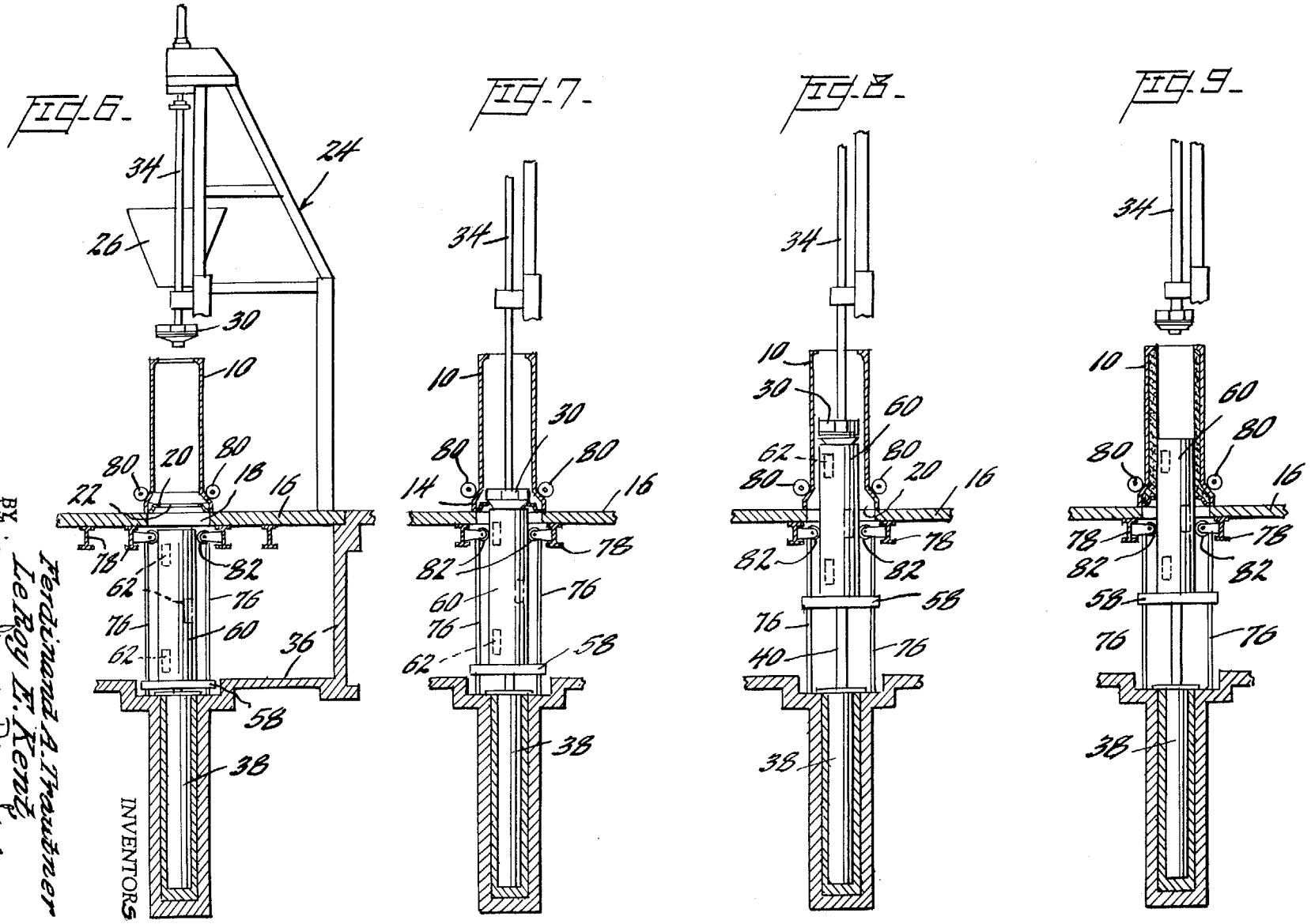
INVENTORS
Ferdinand A. Trautner
LeRoy E. Kent,
BY Wise, Golden & Douglas
Keith Wise Golden
ATTORNEYS INVENTORS
Ferdinand A. Trautner
LeRoy E. Kent,
Mirsegades & Douglas
BY
Keith Mirsegades
ATTORNEYS

VIBRATORY CORE FOR CONCRETE PIPE MAKING MACHINE

Matter enclosed in heavy brackets [ ] appears in the original patent but forms no part of this reissue specification; matter printed in italics indicates the additions made by reissue.

CROSS REFERENCE TO RELATED APPLICATION

This is a continuation-in-part of Ser. No. 638,010, filed May 12, 1967 now abandoned.

BACKGROUND OF THE INVENTION

The invention relates generally to the formation of concrete pipe, and particularly presents a solution to the problem of residual strain created by the troweling of zero slump concrete with rotary motion. In the usual pipe forming apparatus, the outer form of the pipe is stationary. Thus, rotary motion by the packerhead imparts a stress to the concrete mix, such stress being particularly disturbing in the event the concrete pipe is supplied with reinforcing wire. It has been found that such wire may be strained beyond its yield point causing permanent bending as well as deflection of the wire, making the completed pipe product unsatisfactory. Furthermore, because of the difference in modulus of elasticity between steel and concrete relieving such undesirably induced stress after the pipe is formed causes unnecessary voids to be formed in the concrete pipe. Obviously, such voids reduce the strength of cured pipe and allow leakage in the pipe through the voids.

In the case of non-reinforced pipe residual stress movement of the concrete causes cracks to form in the pipe thereby reducing strength of the pipe and permitting leaks. As a result of these encountered problems, many purchasers of concrete pipe refuse to accept pipe formed by a rotating packerhead or roller-head method.

The prior art is not entirely devoid of vibrating cores used in the manufacture of concrete pipe. For example, the U.S. Pat. to E. Robbins, No. 1,504,834, illustrates a core for a pipe form inserted into and withdrawn from the form therebeneath by means of controlled fluid pressure. U.S. Pat. No. 1,961,981 to Pechstadt also discloses a movable core for a pipe form, and a tamper for compacting the cementitious material. A further improvement to the basic concept of these two patents is disclosed by U.S. Pat. No. 2,544,453 to Gaudin which illustrates a vertically movable vibrating core insertable into and withdrawable from a pipe form.

However, none of these patents nor any material presently available in the art of forming concrete pipes discloses a solution to the residual stress problem discussed above which is encountered in the current practice of the manufacture of pipe which employs the use of a vertically disposed form and a packerhead which moves slowly along the axis of the form while rotating and while concrete is poured in to form the pipe.

The instant invention overcomes the disadvantages of the prior art by permitting the formation of concrete pipe by the rotating packerhead method without inducing residual stress either in the concrete or in the reinforcing wire, if used. By employing a vibrating core together with a rotating packerhead as the concrete pipe is formed, residual stresses are avoided due to vibratory motion being imparted to the concrete and reinforcing wire during the pipe forming operation. Of further significance is the fact that the vibrating core of this invention may be used on concrete pipe formed by a variety of other methods such as by spinning, vibration, or tamping, before the pipe is cured so as to relieve all residual stress, fill voids, compact and densify the concrete and induce a more intimate bond between reinforcing wire and the concrete mix prior to curing of the pipe. Finally, desirably larger aggregate may be used in the concrete mix for concrete pipes resulting in a decrease in absorption of the pipe wall because vibration by the core will cause thorough mixing of the concrete as well as a better coating of sand and aggregate particles with cement.

SUMMARY

The object of the invention is to provide a concrete pipe making apparatus which completely negates residual strain caused by the standard pipe forming apparatus by employing a vertically movable internal vibrating core to the pipe as it is formed. In the primary embodiment, the vibrating core is adapted for use with a rotating packerhead as the concrete pipe is formed. Hydraulically actuated interengaging means is provided between the packerhead and the vibrating core which permits rotation to be imparted to the packerhead while allowing the vibrating core to remain axially stationary. Primary lift means is provided for the packerhead and core; fluid pressure actuated means is provided beneath the vibrating core to move the same downwardly after the pipe forming operation. The interengaging means is hydraulically disengaged at the completion of the pipe forming operation to allow removal of the packerhead and withdrawal of the vibrating core from the completed, uncured pipe so that the uncured pipe together with the outer form thereof may be removed from the pipe making machine so that a new outer form may be set into place for formation of another pipe.

BRIEF DESCRIPTION OF THE DRAWINGS

Details of construction and operation according to the preferred embodiments of the invention will become readily apparent by reference to the following drawings wherein:

FIGS. 1 through 5 are front elevational views showing the invention as applied to a concrete pipe making machine of the type commonly used in the industry; these figures show the sequence of operations in forming concrete pipe;

FIGS. 6 through 9 are similar to FIGS. 1 through 5 and show the sequence of operations in forming a concrete pipe according to this invention in another embodiment.

DESCRIPTION OF THE PREFERRED EMBODIMENTS

Figure 10:
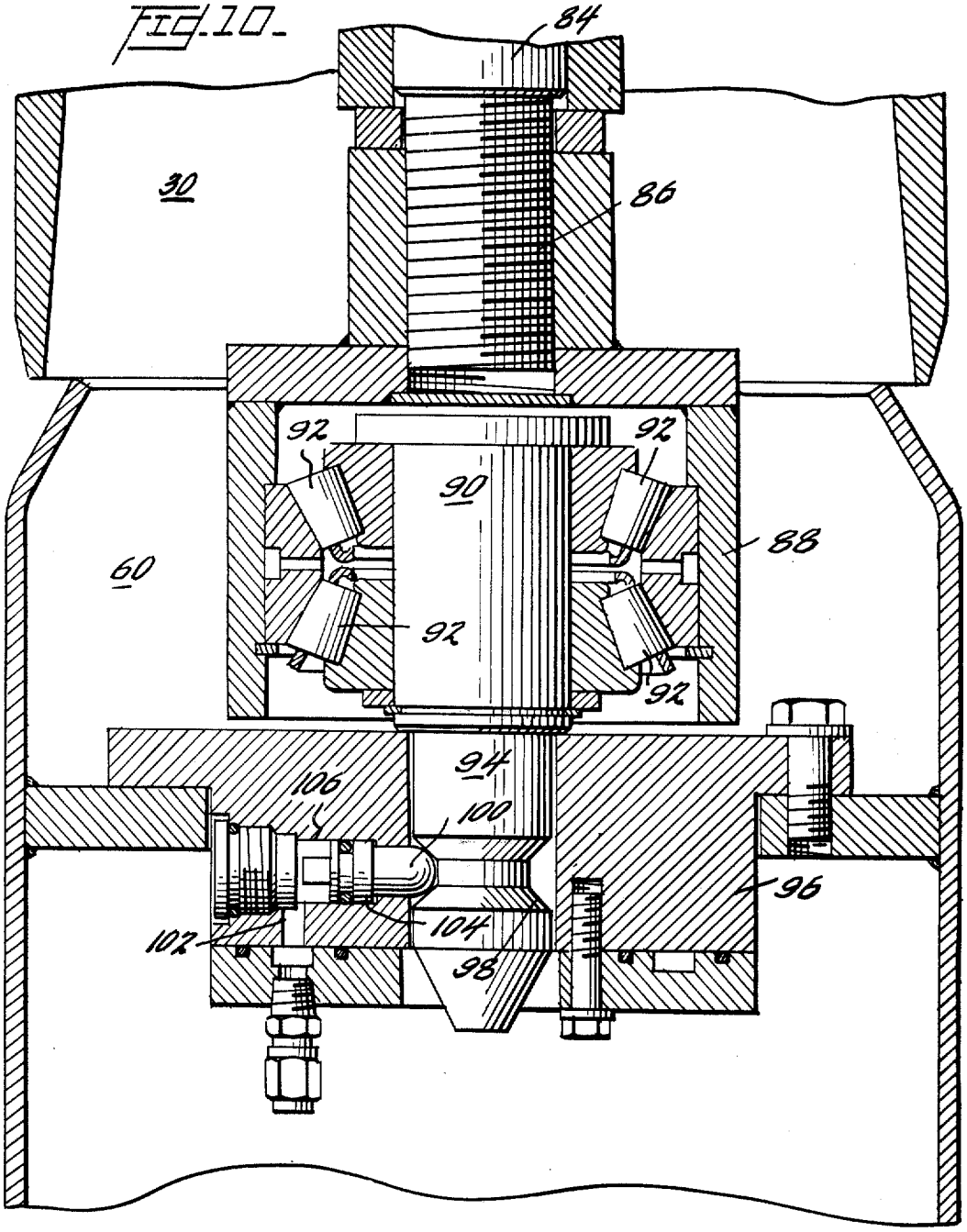
FIG. 10 is a sectional view of the means interengaging the vibrating core and the rotating packerhead and applies to both embodiments of the invention as shown by FIGS. 1 through 5 and by FIGS. 6 through 9.

Referring now to the drawings by reference character and in particular to FIGS. 1 through 5 thereof, the invention is shown in combination with a modified pipe making machine of the type commonly used in the industry today. The pipe making machine comprises a pipe form 10 of generally cylindrical configuration, which may have circular corrugations therein. Form 10 includes an upper, spigot end 12 and a lower, diverging frusto-conical skirt forming a bell end 14. A platform 16 is provided for form 10, and includes a circular opening 18 centrally located beneath bell end 14. Platform 16 may be a turntable for indexing of work.

Interiorally of bell end 14 is a pallet 20 having a circular opening 22 therein, generally concentrically spotted with respect to opening 18 in platform 16. Pallet 20 is slightly movable vertically within bell end 14 for initial formation of the bell end of the pipe.

A frame superstructure generally indicated by 24 is located above platform 16 and includes a cementitious material boot or hopper 26 and a conveyor 28 for filling form 10. Numeral 30 indicates a packerhead, rollerhead, or circular, powered trowel, each of which is known in the art, which distributes and compacts material against the form from bell end 14 upwardly to form the pipe, travelling through mix provided from boot 26 and conveyor 28. Frame 24 supports a vertically movable crosshead (not shown) which drives shaft 34 and distributor 30.

A pit designated at 36 contains the major portion of the instant invention. For ease of explanation, parts will be described from the base of pit 36, upwardly to turntable or platform 16. Mounted in the base of pit 36 is a caisson or hydraulic cylinder 38 having an internal vertically travelling piston (not shown) operatively connected to a piston rod 40 (FIG. 2). A frame assembly comprising a plurality of radially spaced vertical standards 42, 42 is arranged concentrically about cylinder 38 and beneath opening 18 in platform 16. A circular base block plate 44 is secured about cylinder 38 at the floor of pit 36 to standards 42, 42. A similar upper block plate 46 is mounted near the upper ends of standards 42, 42. Between plates 44 and 46 are located a series of radially spaced guide rods 48, 48. Plates 44 and 46 serve additionally as the lower and upper limits respectively of the travel of a bearing block assembly 50, having bearing sleeves formed therein (not shown) about guide rods 48, 48, for free movement therealong. Block assembly 50 cooperating with guides 48, 48 also serves to prevent axial rotation of the vibrating core 60 of the invention.

A cylindrical support casing 52 is mounted on top of block assembly 50 and is affixed to the free end of piston rod 40. A circular opening 54 is provided in the lower face of casing 52 to entry of cylinder 38 when the invention is in a static, initial stage as shown in FIG. 1. A thrust rod 56 is fixed to piston rod 40 through the upper portion of casing 52 having core platform support 58 mounted thereon. Thus axial stability and limitation of travel of core 60 are imparted substantially beneath the lower terminal end of core 60 so that complete insertion into form 10 is allowed, without interfering with the other operating parts of the apparatus, as shown in FIG. 4. Vibrating core 60 is mounted directly on platform 58 being provided with a series of internally spaced vibrators 62 (FIG. 3).

Immediately beneath platform 16 is a pallet lift assembly 64 (FIG. 2) for forming the bell end of the pipe in the initial stage of operation. Such an assembly is described in detail in U.S. Pat. No. 3,083,433 to M. Tiller. For purposes of the instant invention, assembly 64 (FIG. 2) includes a vibrating plate 66 having legs 68 thereon for contacting, lifting and vibrating pallet 20. A drive plate 70 is secured to and immediately beneath vibrating plate 66, plates 66 and 70 being rotatably mounted in frame 42. A motor with suitable gearing drives plate 70 to rotate pallet 20 during the bell forming stage of the pipe making operation. Assembly 64 is raised and lowered by suitable lift means (not shown) and is limited in travel by a pair of limit stops 72, 74.

A second embodiment of the invention is shown in FIGS. 6 through 9 wherein the pipe is formed without aid of pallet lift assembly 64. As in the embodiment illustrated in FIGS. 1 through 5, the pipe making machine includes a bell-down form 10, super-structure 24, packerhead 30 with drive shaft 34, a material hopper 26 and platform or turntable 16. In pit 36 is a caisson or hydraulic cylinder 38 having a piston rod 40 actuated by fluid pressure. Core platform 58 is mounted directly on piston rod 40 (FIG. 8). Controlled movement for platform 58 is provided by a plurality of radially spaced rods 76, 76 mounted directly in the floor of pit 36 and secured at their upper ends to frame portions 78 beneath platform 16. Vibrators 80, 80 are attached to bell end 14 of form 10 to compact material in the bell of the pipe, formed between pallet 20 and form 10. Finally, rollers 82, 82 are mounted beneath platform 16 to frame 78 to guide core 60 into and out of form 10.

FIG. 10 illustrates the specific connection between rotating packerhead 30 and non-rotating core 60. Packerhead 30 includes an internal rotating drive shaft 84 which is threaded at its terminal end 86 to receive a bearing and pilot stud housing 88. Non-rotating support shaft 90 is mounted internally of rotating housing 88 by means of a twin series of inclined roller thrust bearings 92, 92 which are adapted to receive both axial and radial stress on the order of 20,000 pounds and 10,000 pounds respectively. A pilot stud 94 is formed on the lower end of support shaft 90 and is tapered at its thrust end so as to guide itself into lock housing 96 of non-rotating core 60 without aid of external guide means. Pilot stud 94 is formed with a lock recess 98 which cooperates with radially spaced locking studs 100, each actuated by hydraulic pressure through lines 102 against piston 104. Studs 100 and recess 98 are formed with cambered abutting faces so that upon relief of pressure in lines 102, pilot stud 94 will separate from core lock housing 96 by axial movement above, forcing lock studs 100 into their receiving chambers 106.

The operation of the two embodiments of the invention are similar. In the embodiment shown in FIGS. 1 through 5, the invention is depicted first, in FIG. 1, in a static position prior to the pipe making operation. In this position, platform or turntable 16 may be moved (now shown) to place form 10 into position, centrally beneath packerhead 30 and above core 60.

The pipe forming operation begins by the lowering of packerhead 30 together with housing 88 and pilot stud 94 into form 10 and the raising of core 60 by fluid pressure in cylinder 38. Hydraulic pressure is introduced through lines 102 to force studs 100 into recess 98 so that rotating packerhead or rollerhead 30 and core 60 are firmly engaged. Mix is then poured into form 10 from conveyor 28, and pallet lift assembly 64 is raised to the position shown in FIG. 2. The bell end of the pipe is then formed in the manner disclosed in U.S. Pat. No. 3,083,433, as discussed above, by rotating and vibrating the pallet assembly 64. Rotation of packerhead 30 is initiated, in a direction opposite the rotation of pallet 20.

When the bell end portion of the pipe has been completed, assembly 64 is lowered to the static position shown in FIG. 3. Packerhead 30 is then raised through the mix, together with core 60 which is forced upwardly by fluid pressure in cylinder 38 acting through piston rod 40, thrust rod 56, and core platform 58. As each vibrator 62 passes bell-end 14 of form 10, it is activated by a trip switch or other suitable energizing means (not shown) to vibrate that portion of the core. When packerhead 30 has reached the top or spigot end 12 of form 10, rotation ceases, fluid pressure in line 102 is relieved, and packerhead 30 is lifted from core 60, as illustrated in FIG. 4. Vibration of core 60 by vibrators 62 is continued for a short time to complete compaction of mix, particularly around spigot end 12 of form 10, and to assure the complete elimination of any residual stress in the completed pipe which may have been caused by the rotation of packerhead 30.

Once vibration is satisfactorily completed core 60 is withdrawn from the finished pipe by cylinder 38, turntable 16 is moved to place a new form 10 into position and to remove the newly completed green pipe.

[ Of course, vibrators 62 might be replaced by, or supplemented with vibrators located externally of the invention, as on form 10 (not shown). The important point is that vibratory motion be imparted to the mix as the pipe is being formed to assure complete compaction of the mix. ]

The operation of the second embodiment of the invention shown in FIGS. 6 through 9 is similar, except that bell end 14 of the pipe is formed by vibration induced by vibrators 80 located therearound. Once the bell end is formed, vibrators 80 are turned off, and the remainder of the operation discussed above is completed.

Green pipe formed from cementitious material by a rotary trowel method or other methods common in the art may be transferred to the invention while still in its mold to be vibrated by insertion of core 60 thereinto. This operation will remove residual stress in the green pipe and give the cured pipe the structural integrity assured by use of the present invention during the initial forming stage of the pipe.

Three-edge bearing tests were made on concrete pipe formed by the invention and results were compared with results obtained from testing pipe manufactured without the aid of the instant invention. Five test specimens were manufactured having only 74 percent of the steel reinforcement used in our specimens manufactured by the older process. These tests were conducted to specifications for three-edge bearing tests contained in "TENTATIVE SPECIFICATIONS FOR REINFORCED CONCRETE CULVERT, STORM DRAIN AND SEWER PIPE" (C 76–63T), published by the American Society for Testing and Materials in 1963. The values listed in the D-load columns below are test loads expressed in pounds per linear foot per foot of pipe diameter. The four specimens manufactured by the older process were made according to the ASTM requirements for Class IV reinforced concrete pipe. The test results of the pipe manufactured according to the invention were as follows:

| Made | Tested | D-load 0.01" crack | D-load Ultimate | Vibrated |
|---|---|---|---|---|
| x | x+2 days | 2200 lbs. | 3380 lb. | 5 min. |
| x | x+3 days | 2024 lbs. | 3705 lb. | 5 min. |
| x | x+3 days | 2102 lbs. | 3477 lb. | 5 min. |

-continued

| Made | Tested | D-load 0.01" crack | D-load Ultimate | Vibrated |
|---|---|---|---|---|
| x | x+3 days | 2124 lbs. | 3306 lb. | 4 min. |
| x | x+3 days | 1893 lbs. | 3293 lb. | 2 min. |

Each pipe was 8 feet long, 2 feet in diameter and had a wall thickness of 3 inches, and was given 10 hours of moist curing.

The four specimens manufactured in the manner known in the art yielded the following test results:

| Made | Tested | D-load 0.01" crack | D-load Ultimate |
|---|---|---|---|
| x | x+50 days | 2400 lb. | 3280 lb. |
| x | x+20 days | 2020 lb. | 3100 lb. |
| x | x+10 days | 1970 lb. | 3320 lb. |
| x | x+25 days | 2100 lb. | 3470 lb. |

These latter specimens compare precisely in size to the former, save that these four specimens contained a significantly greater amount of reinforcing steel, and were aged for a considerably longer period of time. Yet the pipes formed according to the present invention performed as well as those made in a usual manner.

[We claim:] *What I claim and desire to secure by Reissue Letters Patent is:*

1. In a concrete pipe forming apparatus adapted for forming pipe from zero-slump concrete including a pipe form, a platform for supporting said pipe form, a rotating packerhead material distributor comprising a rollerhead for forming the pipe, and a powered main lift mechanism for raising said rollerhead as the pipe is formed, the improvement comprising:

a. a non-rotating core;

b. means for vibrating material forming the pipe as the pipe is formed;

c. means interengaging said core with said rollerhead; and d. an upwardly movable guide system for said core [.] ,

*said means for vibrating material forming the pipe as the pipe is formed comprising means attached to the core for vibrating the core.*

[ 2. The apparatus of claim 1 wherein said means for vibrating material forming the pipe as the pipe is formed comprise means attached to the core for vibrating the core. ]

3. The apparatus of claim [ 2 ] *1* wherein said means attached to the core for vibrating the core include a plurality of vibrators, spaced vertically along the interior wall thereof, each of said vibrators being selectively actuable.

4. The apparatus of claim 3 wherein the means for selectively actuating the vibrators comprise means for energizing each of said vibrators as said each vibrator passes beneath the lower terminal edge of said pipe form as said core enters the pipe form.

5. The apparatus of claim 1 wherein said upwardly movable guide system for said vibratory core comprises:

a. a fluid pressure cylinder, located concentrically beneath said core;

b. a piston in said cylinder;

c. a piston rod on said piston;

d. a support platform for said core operatively mounted on said piston rod;

e. vertical guide rods radially spaced about said piston rod and extending upwardly toward said platform; and f. means connecting said guide rods and core platform whereby rotational movement of said core is prevented.

6. The apparatus of claim 5 wherein said means connecting said guide rods and core platform comprise:

a. a cylinder easing support, depending from said core platform, about said piston rod and fluid cylinder; and b. a bearing block assembly, depending from said casing and itnerengaged for sliding movement with said guide rods, whereby lateral and axial stability is imparted to said core substantially beneath the thrust end of said piston rod.

7. The apparatus of claim 6 wherein said guide rods are further provided with upper and lower stops defining the vertical limits of movement of said bearing block assembly.

8. The device of claim 1 wherein said means interengaging said distributor and said core comprise:

a rotatable housing, firmly secured to and depending from said distributor, axially thereof;

b. a non-rotating support shaft, depending axially from said rotatable housing;

c. bearing means interconnecting said support shaft and housing allowing free rotation of said housing around said support shaft;

d. a lock housing mounted on the upper free end of said core; and e. disconnectable securing means acting between said lock housing and said support shaft.

9. The interengaging means of claim 8 wherein said bearing means comprise a plurality of inclined bearings adapted to receive thrust and radial loading.

10. The interengaging means of claim 8 wherein said disconnectable securing means comprise:

a. a male pilot stud on said support shaft;

b. a female lock sleeve in said lock housing;

c. means defining a recess circumferentially about said pilot stud; and d. a plurality of fluid pressure actuable lock studs in said sleeve adapted to enter said recess.

11. The disconnectable securing means of claim 10 wherein said lock studs and said core are formed with inclined mating faces whereby upon relief of fluid pressure on said lock studs and axial separation of said core and distributor, said lock studs are withdrawn into said lock housing thereby permitting axial separation of said core from said distributor.

12. The invention as recited in claim 1 wherein the pipe form contains a reinforcing wire structure for the pipe.

13. In a concrete pipe forming apparatus adapted for forming pipe from zero-slump concrete including a pipe form, a platform for supporting said pipe form, a rotating packerhead material distributor comprising a rotating trowel for forming the pipe, and a powered main lift mechanism for raising said rotating trowel as the pipe is formed, the improvement comprising:

a. a non-rotating core;

b. means for vibrating material forming the pipe as the pipe is formed;

c. means interengaging said core with said rotating trowel; and d. an upwardly movable guide system for said core [.] ,

*said means for vibrating material forming the pipe as the pipe is formed comprising means attached to the core for vibrating the core.*

[14. The apparatus of claim 13 wherein said means for vibrating material forming the pipe as the pipe is formed comprise means attached to the core for vibrating the core.]

15. The apparaus of claim [ 14 ] *13* wherein said means attached to the core for vibrating the core include a plurality of vibrators, spaced vertically along the interior wall thereof, each of said vibrators being selectively actuable.

16. The apparatus of claim 15 wherein the means for selectively actuating the vibrators comprise means for energizing each of said vibrators as said each vibrator passes beneath the lower terminal edge of said pipe from as said core enters the pipe form.

17. The apparatus of claim 13 wherein said upwardly movable guide system for said vibratory core comprises:

a. a fluid pressure cylinder, located concentrically beneath said core;

b. a piston in said cylinder;

c. a piston rod on said piston;

d. a support platform for said core operatively mounted on said piston rod;

e. vertical guide rods radially spaced about said piston rod and extending upwardly toward said platform; and f. means connecting said guide rods and core platform whereby rotational movement of said core is prevented.

18. The apparatus of claim 17 wherein said means connecting said guide rods and core platform comprise:

a. a cylindrical casing support, depending from said core platform, about said piston rod and fluid cylinder; and b. a bearing block assembly, depending from said casing and interengaged for sliding movement with said guide rods, whereby lateral and axial stability is imparted to said core substantially beneath the thrust end of said piston rod.

19. The apparatus of claim 18 wherein said guide rods are further provided with upper and lower stops defining the vertical limits of movement of said bearing block assembly.

20. The device of claim 13 wherein said means interengaging said distributor and said core comprise:

a. a rotatable housing, firmly secured to and depending from said distributor, axially thereof;

b. a non-rotating support shaft, depending axially from said rotatable housing;

c. bearing means interconnecting said support shaft and housing allowing free rotation of said housing around said support shaft;

d. a lock housing mounted on the upper free end of said core; and e. disconnectable securing means acting between said lock housing and said support shaft.

21. The interengaging means of claim 20 wherein said bearing means comprise a plurality of inclined bearings adapted to receive thrust and radial loading.

22. The interengaging means of claim 20 wherein said disconnectable securing means comprise:

a. a male pilot stud on said support shaft;

b. a female lock sleeve in said lock housing;

c. means defining a recess circumferentially about said pilot stud; and d. a plurality of fluid pressure actuable lock studs in said sleeve adapted to enter said recess.

23. The disconnectable securing means of claim 22 wherein said lock studs and said core are formed with inclined mating faces whereby upon relief of fluid pressure on said lock studs and axial separation of said core and distributor, said lock studs are withdrawn into said lock housing thereby permitting axial separation of said core from said distributor.

24. The invention as recited in claim 13 wherein the pipe form contains a reinforcing wire structure for the pipe.

* * * * *